（12） United States Patent
Porter et al.

(10) Patent No.: US 6,337,947 B1
(45) Date of Patent: Jan. 8, 2002

(54) METHOD AND APPARATUS FOR CUSTOMIZED EDITING OF VIDEO AND/OR AUDIO SIGNALS

(75) Inventors: Allen J. Porter, Thornhill; Antonio Rinaldi, Maple; Raymond Li, Markham, all of (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/047,194

(22) Filed: Mar. 24, 1998

(51) Int. Cl.[7] .............................................. H04N 5/76
(52) U.S. Cl. ........................................ 386/55; 386/52
(58) Field of Search .............................. 386/55, 52, 54, 386/46, 83, 109, 111, 112, 1, 4, 27, 33, 92, 96, 104, 95; H06N 5/76

(56) References Cited

U.S. PATENT DOCUMENTS 5,172,111 A * 12/1992 Olivo, Jr. ................ 340/825.31
5,664,046 A * 9/1997 Abecassis .................... 386/125

* cited by examiner

*Primary Examiner*—Robert Chevalier
(74) *Attorney, Agent, or Firm*—Vedder, Price, Kaufman & Kammholz

(57) ABSTRACT

A method and apparatus for customized editing and/or censoring of video and/or audio signals begins when a signal and a plurality of editing parameters are received. The signal includes an audio and/or video signal, where each of the editing parameters corresponds to separate portions of the signal. The editing parameters may be embedded within the signal or provided in simulcast with the signal. While the signal is being processed, a selective editing circuit is monitoring the editing parameters. When an editing parameter indicates that the corresponding portion of the signal is to be edited, the selective editing circuit edits the corresponding portion based on the editing parameter, which may be provided by the content provider or the user. In addition, the editing parameter may indicate various levels of editing the signal. For example, the editing parameter may indicate that the portion of the audio and/or video signal is to be completely blanked, skipped, faded, distorted, or is to be replaced with a substitute audio and/or video signal.

28 Claims, 4 Drawing Sheets

METHOD AND APPARATUS FOR CUSTOMIZED EDITING OF VIDEO AND/OR AUDIO SIGNALS

TECHNICAL FIELD OF THE INVENTION

The present invention relates generally to video and audio processing systems and more particularly to customized editing and/or censoring of video and/or audio signals.

BACKGROUND OF THE INVENTION

The entertainment industry is producing an ever-increasing number of video and/or audio products for private and public use. Today, a consumer may rent or purchase a movie in a video cassette format, a laser disk format, a DVD format, or the home viewer may rent, or view, a movie via broadcasts from a local cable station or from a satellite broadcasting company. Similarly, for audio products, a consumer may purchase audiocassettes, CDs, or soundtracks, or listen to broadcast radio or satellite audio broadcasts. In addition to the numerous sources of audio and/or video merchandise, the content of such merchandise is more explicit than in the past. As such, the debate over how and who should censor such materials is increasing.

The movie industry has addressed the censorship issue by providing ratings to the movies it produces based on the audio and/or video content. Such ratings include: G indicating that the content is acceptable for general audiences; PG indicating that parental guidance is suggested since some of the content may be to mature for all persons; PG-13 indicating that the movie may be inappropriate for children under 13; R indicates that the movie is restricted such that no one under the age of 17 may view the movie, in a theater, without his or her parents; R-17 indicates that no one under the age of 17 is allowed to view the movie in a theater, and X indicating that the content is explicitly for adults. Based on these rating parents and/or guardians may monitor the movies in which they allow their children to view at a movie theater.

While the rating system works fairly well to restrict younger viewers from viewing inappropriate movies at public theaters, it only provides guidance for parents and/or guardians. With the explosion of audio and/or video resources, especially cable and satellite that are provided directly to the home, the challenge to monitor a child's viewing choices is becoming an increasingly difficult task. To address this issue, the United States has undertaken a quest to establish a standard that would enable a parent to restrict their children's viewing. Such a standard revolves around the V-chip technology. In essence, the V-chip technology allows a parent to enable a video and/or audio source receiver (e.g., television, cable box, satellite receiver) to restrict the showing of movies that the parents have deemed inappropriate for their children. As such, the parent can set the V-chip to any desired level of censoring.

While the V-chip technology allows parental control over viewing of movies, it is done in an all-or-nothing manner. In the all-or-nothing approach, a parent can establish the setting such that any movie that has a particular rating (e.g., PG-13) or greater will be blocked from being displayed. Many movies that have a mature rating include only a few scenes or use mature language, but otherwise would be appropriate for younger viewers. As such, these movies cannot be viewed. In addition, the censor ratings are established primarily by the video content providers, thus the public is subjected to the video content providers' opinion of what is appropriate.

Therefore, a need exists for a method and apparatus that allows selective editing and/or censoring of video materials and/or audio materials.

DETAILED DESCRIPTION OF A PREFERRED EMBODIMENT

Generally, the present invention provides a method and apparatus for customized editing and/or censoring of video and/or audio signals. Such a process begins when a signal and a plurality of editing parameters are received. The signal includes an audio and/or video signal, where each of the editing parameters corresponds to separate portions of the signal. The editing parameters may be embedded within the signal or provided in simulcast with the signal. While the signal is being processed (e.g., a video is being displayed), a selective editing circuit is monitoring the editing parameters. When an editing parameter indicates that the corresponding portion of the signal is to be edited, the selective editing circuit edits the corresponding portion based on the editing parameter, which may be provided by the content provider or by the user. In addition, the editing parameter may indicate various levels of editing the signal. For example, the editing parameter may indicate that the portion of the audio and/or video signal is to be completely blanked, skipped, faded, distorted, or is to be replaced with a substitute audio and/or video signal. With such a method and apparatus, video products and/or audio products may include selectively editing and/or censoring features such that content of an audio and/or video signal may be edited, or censored, to the users desired settings without the all-or-nothing approach of previous censoring devices.

The present invention can be more fully described with FIGS. 1 through 4.

Figure 1:
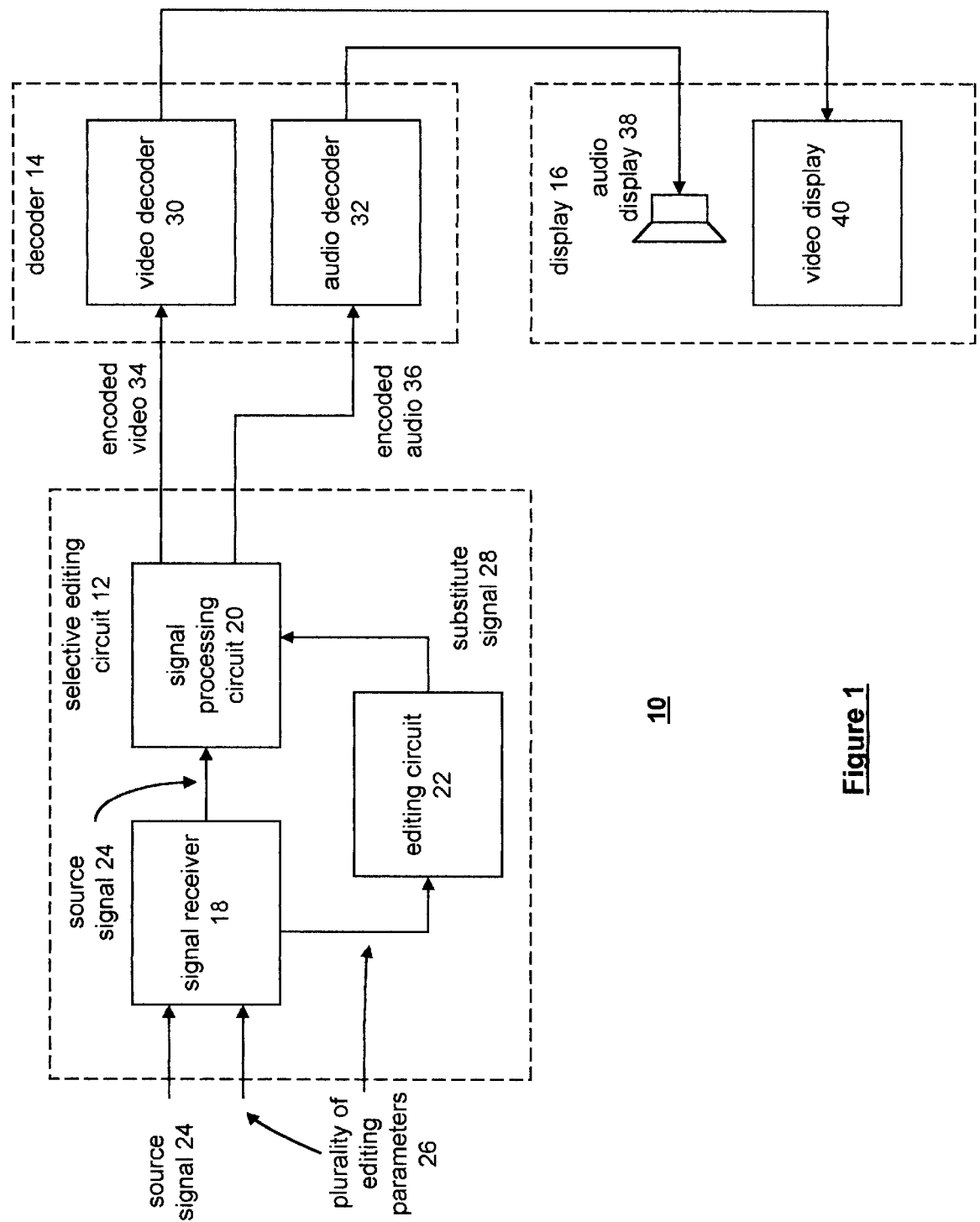
FIG. 1 illustrates a schematic block diagram of a video and audio receiver in accordance with the present invention.

FIG. 1 illustrates a schematic block diagram of a video and/or audio processing system 10 that includes a selective editing circuit 12, a decoder 14, and a display 16. The decoder 14 includes a video decoder 30 and/or an audio decoder 32. The display includes an audio display 38 and/or a video display 40. Depending on the type of system 10, the decoder 14 may include only a video decoder 30 while the display 16 includes only a video display 40. Alternatively, if the system 10 is an audio processing device, such as a CD player, the decoder 14 would include only the audio decoder 32 and the display 16 would only include the audio display 38. As a further example, if the system 10 is a computer television set, cable box, satellite receiver, DVD player, etc., the decoder 14 would include both the video decoder 30 and the audio decoder 32, and the display 16 would include both the audio display 38 and the video display 40.

The video decoder 30 is operably coupled to receive digitized video signals and provide analog representations thereof to analog video displays 40 (e.g., CRT displays) and provide digital representation thereof to digital displays 40

(e.g., LCD displays). As such, the video decoder 30 of the present invention may be one that is currently used in state of the art computers, satellite receivers, DVD players, VCRs, cable boxes, set-top boxes, and televisions, or the commercial grade versions. The audio decoder 32 is operably coupled to receive analog and/or digitized audio signals and provide analog representations thereof to analog audio displays 38(e.g., cassette players) and provide digital representation thereof to digital audio displays 38 (e.g., CD players). As such, the audio decoder 32 of the present invention may be one that is currently used in state of the art computers, televisions, and CD players, or commercial grade computers, televisions, and CD players.

The selective editing circuit 12 includes a signal receiver 16, a signal processing circuit 20, and an editing circuit 22. The signal receiver 16 is operably coupled to receive a source signal 24 and a plurality of editing parameters 26. The source signal 24 may include a video and audio signal provided by a video cassette player, DVD player, broadcast television, satellite broadcast, cable broadcast, etc. where the plurality of editing parameters 26 are embedded in the signal source 24 or obtained in a simulcast transmission. If the editing parameters 26 are embedded in the signal 24, the signal content provider would most likely provide them. If the user provides the editing parameters 26, they would be stored in memory and simulcast with the signal 24.

The signal receiver 16 separates the plurality of editing parameters 26 from the signal 24 and provides the editing parameters 26 to the editing circuit 22. The editing circuit 22 compares the plurality of editing parameters with an editing threshold that has been established by the user. When the editing circuit 22 detects that an editing parameter 26 has exceeded the editing threshold, the editing circuit 22 provides a substitute signal 28 to the signal processing circuit 20. Note that the exceeding includes matching a set of parameters, eclipsing a threshold, and/or any other comparison techniques that indicates editing is to be performed. The signal processing circuit 20 utilizes the substitute signal 28 in place of the corresponding portion of the source signal 24 associated with the editing parameter. The signal processing circuit 20 outputs the encoded video signal 34 and/or an encoded audio signal 36.

The number of editing parameters in relation to the source signal 24 may vary greatly. For example, an editing parameter may be included with each frame of video and/or audio of the signal source 24. The editing parameter may therefore provide an indication of the mature theme of the video and/or audio content of the associated frame. Alternatively, the editing parameters may only be included with every X number of frames, for example, every 10, 15, 20, etc. frames. Alternatively, the editing parameters may only be included when the signal source includes a scene that is above the lowest threshold rating. In other words, all frames containing video and/or audio content that would be deemed general audience viewing, would not have an editing parameter. Scenes that have a rating greater than G would have an associated heading parameter. As one as average skill in the art can readily appreciate correlating editing parameters to the signal source can be done in any number of combinations. In addition to the editing parameters functioning as censoring parameters, they may function as selective customizing parameters. For example, if the signal source is a movie, the user may choose to substitute his or her name, and/or face, for one of the main characters' name, and/or face. In this example, every time that the main character's name, and/or face, appears in the unedited signal, the user's name, and/or face, would be used, i.e., be the substitute signal 28. For an audio source signal (e.g., a song), the user could substitute a name into the song. In this manner, a user can customize a particular movie and/or song to his or her personal preferences.

The substitute signal 28 provided by the editing circuit 22 may be a blanking signal, such that the screen blanks, or blue screens, and the audio signal is muted. Additionally, the substitute signal 28 may include an alternate video, alternate audio signal, fading of the original signal, distorting of the original signal, or any combination thereof.

Figure 2:
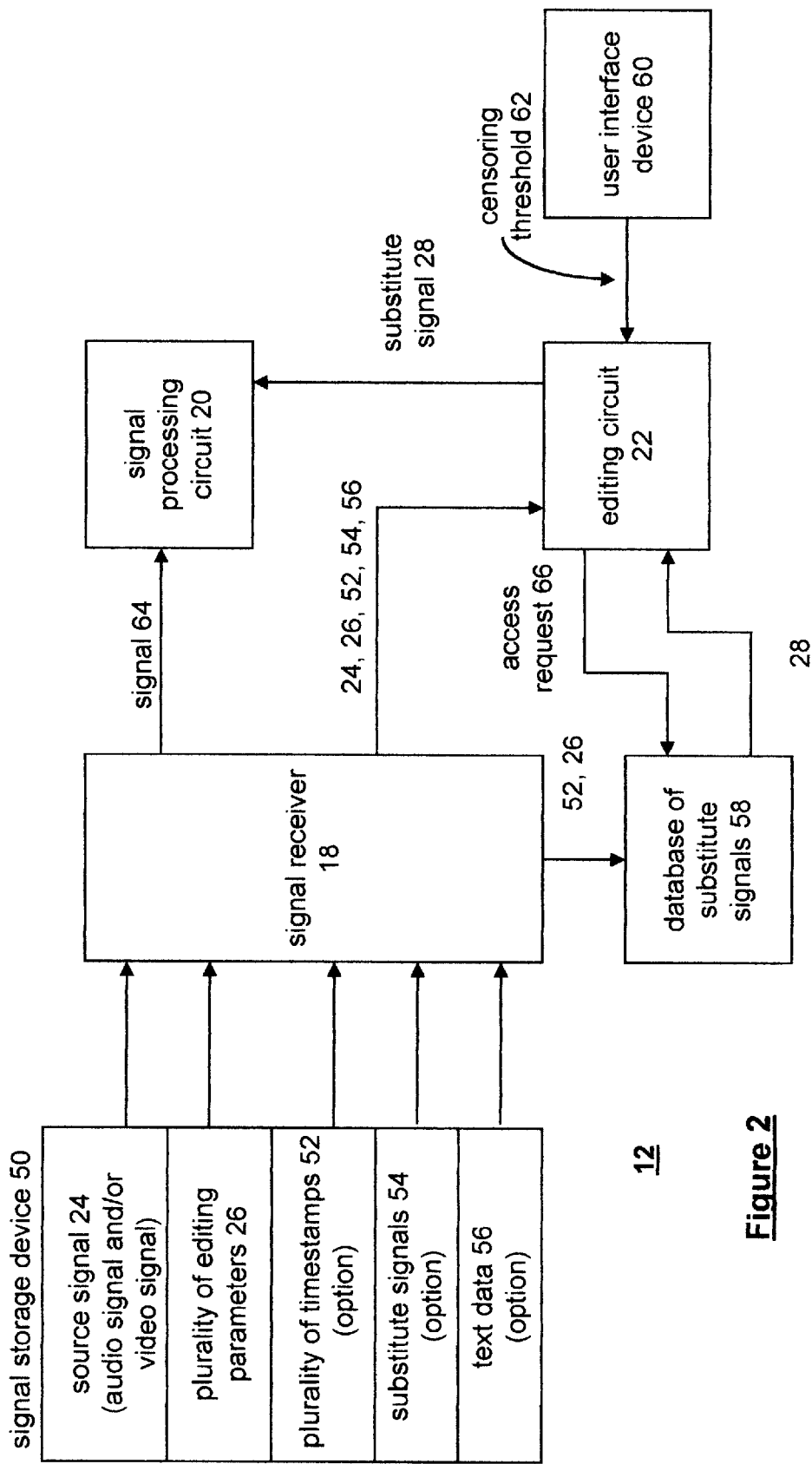
FIG. 2 illustrates a schematic block diagram of the selective editing circuit of FIG. 1.

FIG. 2 illustrates a more detailed schematic block diagram of the selective editing circuit 12. The selective editing circuit 12 includes the signal receiver 18, the signal processing circuit 20, the editing circuit 22, a user interface 60, and a database of substitute signals 56. The signal receiver 18 is operably coupled to receive data from a signal storage device 50, which may be a memory device such as DVD disk, video cassette, floppy disk, CD ROM, or a temporary memory storage that is temporarily storing a television broadcast, satellite broadcast and/or cable broadcast.

The signal storage device 50 stores the source signal 24, which may be an audio signal and/or video signal, and the plurality of editing parameters 26. In addition, the signal storage device may store a plurality of time stamps 52, substitute signals 54, and text data 56. The time stamps 52 are used, in conjunction with the editing parameters, by the editing circuit to determine the precise time for providing a substitute signal in place of the source signal. The substitute signals 54 may include a plurality of alternate scenes and audio such that mature scenes and audio of a mature rated movie (e.g., R-rated) may be replaced with more appropriate scenes and audio. If the signal storage device 50 is storing text data 56 (e.g., closed caption), the editing circuit can scan for offensive text language and if detected, edit or censor the offensive language.

As such, the selective editing circuit 12 provides a user a tremendous amount of flexibility in censoring and/or editing a movie, video clip, text, and/or audio clip. In addition, the user may disable the selective editing circuit 12 such that the signal source 24 is presented without editing or censoring.

In operation, the signal receiver 18 receives the source signal 24 and the plurality of editing parameters 26, and may also receive the plurality of time stamps 52, the substitute signals 54 and the text data 56. Upon receiving this information, the signal receiver 18 functions as a parsing circuit to provide the appropriate data to the respective circuit elements 20 and 22. For example, the signal receiver 10 provides the editing parameters to the editing circuit 22 when the editing parameters are embedded in the source signal 24 or transmitted in simulcast with the source signal 24. Alternatively, if the editing parameters are simulcast with the source signal (i.e., not embedded, but transmitted in sync with the source signal), the editing circuit 22 could be receive them directly. The signal receiver 18 provides the signal portion of the source signal 24 to the signal processing circuit 20. Further, if the signal storage device 50 is storing time stamps 52, substitute signals 54, and/or text data 56, the signal receiver 18 would provide them to the editing circuit 22. As yet another alternative, the signal receiver 18 may simply pass the received information to the editing circuit 22, which will extract the appropriate data.

When the editing circuit 22 detects that an editing parameter exceeds an editing threshold, it provides a substitute signal 28 to the signal processing circuit 20. Note that the substitute signal may be retrieved from the database 56 or extracted from the information received from the signal storage device 50. When the substitute signal 28 is retrieved from the database, the editing parameters are used as addresses (directly or converted by an address generation unit) to retrieve the appropriate substitute signal 28. Further note that a user, via the user interface 60, may provide the editing threshold. In this case, the user could establish a censoring threshold 62 based on his or her personal preferences. As such, if the user has small children, the censoring threshold can be set to a general audience setting or to a PG setting. Further note, that the user may establish a plurality of censoring thresholds corresponding to different passwords. As such, a user could establish one censoring threshold for older children and provide the older children with the corresponding password whereby the appropriate censoring is applied.

The signal processing circuit 20 receives the signal 64 and/or the substitute signal 22 and outputs one or the other to produce the encoded video 34 and/or the encoded audio 36. As such, the signal processing circuit 20 functions as a signal switch that provides the signal 64 to the decoder 14 unless it detects a substitute signal 28. When the substitute signal 28 is detected, the signal processing circuit 20 stops providing the signal 64 and, in its place, provides the substitute signal 28. When the signal processing circuit 20 ceases to detect the substitute signal 28, it resumes providing the signal 64. As one of average skill in the art will appreciate the switching between the signal 64 and the substitute signal 28 may be done in a variety of ways, including switching controls provided by the editing circuit 22 to the signal processing circuit 20, wherein the control signals are determined based on at least one of the editing parameters, a timestamp, and/or the text data 56. As one of average skill in the art will further appreciate, the synchronization between the source signal and any substitute signal should be maintained be such that minimal video and/or audio adverse effects occur.

Figure 3:
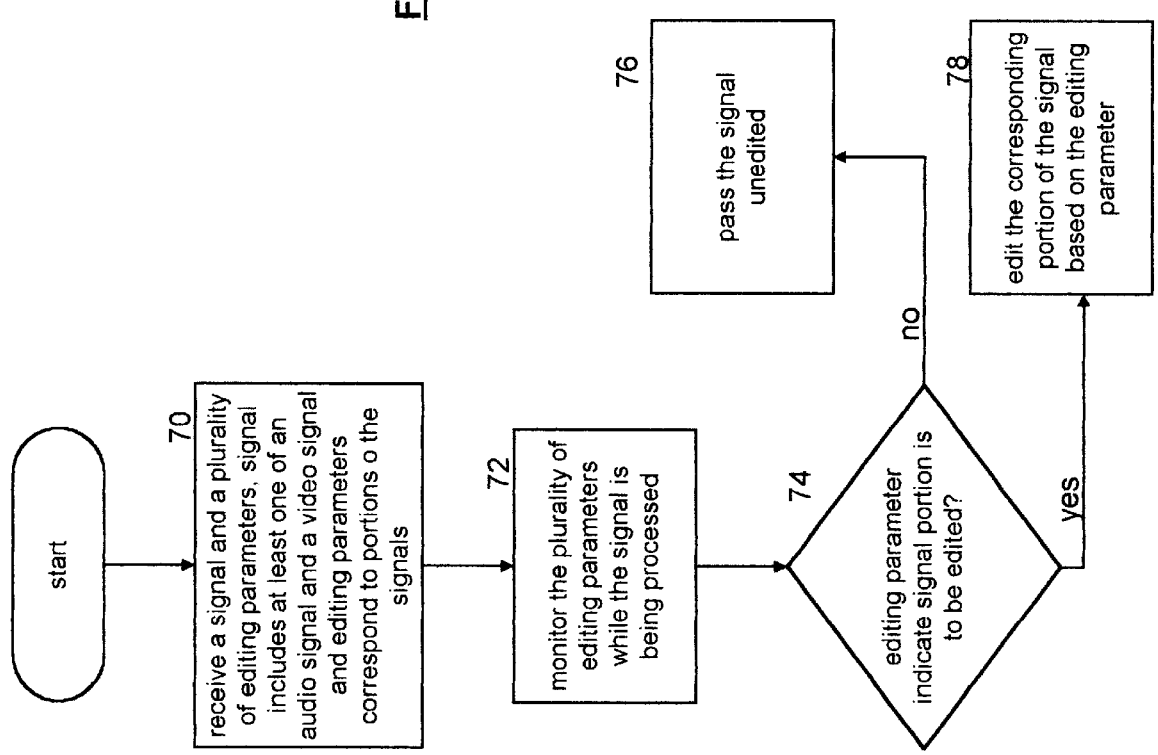
FIG. 3 illustrates a logic diagram of a method for selective editing and/or censoring of video and/or audio signals in accordance with the present invention.

FIG. 3 illustrates a logic diagram of a method of customized editing of video and/or audio signals. The process begins at step 70 where a signal and a plurality of editing parameters are received. The signal includes an audio and/or video signal and the editing parameters correspond to separate portions of the signal. The editing parameters may be embedded into the signal such that the content provider provides them along with the source signal. The editing parameters may be provided for a frame of the signal data, a group of frames of data, and/or for a sub-frame of data. As an alternative to the plurality of editing parameters being embedded in the signal, they may be simulcast with the signal. In the embedded format (e.g., teletext data in a television transmission), the editing parameters may be represented by three or four bits of data depending on the number of editing, or censoring levels. For example, the V-chip indicates six censoring levels, all children, directed to older children, general audience, parental guidance suggested, parents strongly cautioned, and mature audiences only. Thus to represent the six levels, three bits of data would be needed. For more complex editing, such as selecting particular substitute signals, the number of bits would need to increase according to the number of potential substitute signals.

The process proceeds to step 72 where the plurality of editing parameters is monitored while the signal is being processed. In addition to the editing parameters being embedded or simulcast with the signal, the editing parameters may be derived from the content of the signal as the signal is being processed. For example, the editing circuit 12 of FIGS. 1 and 2 may be programmed to detect certain language and, when that language is detected, providing a substitute signal. The process then proceeds to step 74 where a determination is made as to whether an editing parameter indicates that a signal portion is to be edited. If not, the signal passes unedited at step 76. If, however, the editing parameter indicates editing, the process proceeds to step 78. At step 78, the corresponding portion of the signal is edited based on the editing parameter. Such editing was previously discussed.

Figure 4:
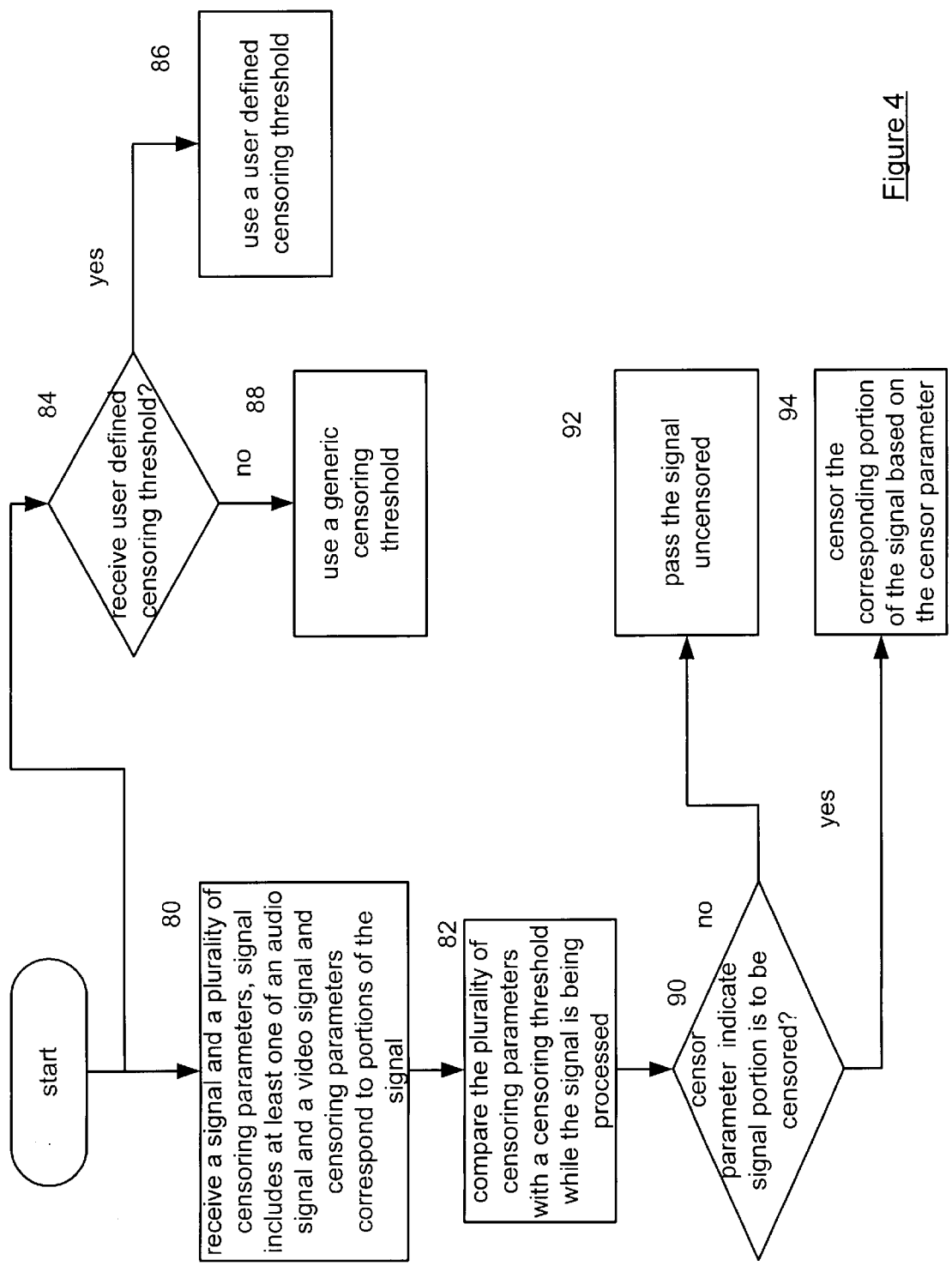
FIG. 4 illustrates a logic diagram of an alternate method for selective editing and/or censoring of video and/or audio signals in accordance with the present invention.

FIG. 4 illustrates a logic diagram of an alternate method for selective, or customized, censoring of a source signal. The process begins at step 80 where a signal and a plurality of censoring parameters are received. The signal includes an audio signal and/or a video signal and the censoring parameters correspond to portions of the signal. The process then proceeds to step 82 where the plurality of censoring parameters are compared to a censoring threshold while the signal is being processed. The process then proceeds to step 90 where a determination is made as to whether one of the censor parameters indicates that a signal portion is to be censored. If not, the process proceeds to step 92 where the signal portion is passed uncensored. If, however, the signal is to be censored, the process proceeds to step 94. At step 94 the corresponding portion of the signal is censored based on the censor parameter. The censoring of the corresponding portion includes replacing the censored portion of the signal by a substitute signal, which may be a blanking signal, an alternate video signal, an alternate audio signal, a scrabbled video signal, a scrabbled audio signal, a fading mute audio signal, and/or a fading blank video signal.

In addition to processing steps 80, 82 and 90–94, the process also determines at step 84 whether it has received user-defined censoring thresholds. If so, the process proceeds to step 86 where the user defined censoring threshold is used. The user-defined censoring threshold may be stored such that it is used for future playback of the source signal. If, however, a user-defined censoring threshold was not received the process proceeds to step 88 where a generic-censoring threshold is used. The process then continues at step 82 utilizing either the user-defined censoring threshold or the generic censoring threshold. Note that the content provider typically provides the generic censoring threshold.

The preceding discussion has presented a method and apparatus for selective, or customized, editing of source signals, which includes a video signal and/or an audio signal. Such selective editing may be incorporated in personal computers, CD players, televisions, and/or any device that is capable of playing an audio and/or video signal. In one application of the selective editing, a user may censor the content of video and/or audio signals to censor any deemed inappropriate content. In addition, the selective editing may be used purely for pleasure of the viewer such that the audio and/or video may be customized to a user's particular desires. As one of average skill in the art would readily appreciate, there are a plurality of various embodiments that could be conceived of that incorporate the spirit of the present invention and such diverse embodiments are deemed to be within the scope of the present invention.

What is claimed is:

1. A method for customizing video and audio signals, the method comprises the steps of:
   a) receiving a signal and a plurality of editing parameters, wherein the signal includes at least one of an audio signal and a video signal, and wherein each of the plurality of editing parameters corresponds to a portion of the signal, and wherein the plurality of editing parameters are user supplied editing parameters;

b) comparing the editing parameters with an editing threshold set by the user while the signal is being processed; and c) when one of the editing parameters exceeds the editing threshold, editing the corresponding portion based on the one of the editing parameters.

2. The method of claim 1, wherein step (a) further comprises the plurality of editing parameters being embedded in the signal.

3. The method of claim 1, wherein step (a) further comprises receiving the plurality of editing parameters in a simulcast with the signal.

4. The method of claim 1 further comprises:
receiving a plurality of censoring parameters as the plurality of editing parameters;
when one of the plurality of censoring parameters exceeds a censoring threshold, censoring the corresponding portion of the signal.

5. The method of claim 4 further comprises receiving the censored threshold from a user interface device.

6. The method of claim 5 further comprises storing an output of the user interface device for future playback.

7. The method of claim 4 further comprises determining the censoring threshold based on at least one of: generic censoring and user defined censoring.

8. The method of claim 1 further comprises:
receiving a plurality of timestamps that are associated with the signal, wherein each of the plurality of timestamps relates to a corresponding one of the portions of the signal; and
when one of the plurality of editing parameters indicates that the corresponding portion of the signal is to be edited, accessing a database to provide a substitute signal in the corresponding portion of the signal, wherein the database is accessed based on at least one of: a corresponding one of the plurality of timestamps and the one of the plurality of editing parameters.

9. The method of claim 8 further comprises the substitute signal including at least one of: a blanking signal, an alternate video signal, an alternate audio signal, a scrambled video signal, a scrambled audio signal, a fading mute audio signal, and a fading blank video signal.

10. The method of claim 1 further comprises each portion of the signal including at least one of: a frame of data, a group of frames of data, and a sub-frame of data.

11. The method of claim 1 further comprises:
receiving text data with the signal, and
editing the text data based on the one of the plurality of editing parameters when the one of the plurality of editing parameters indicates that the text data is to be edited.

12. The method of claim 1 further comprises:
receiving text data that is associated with the signal;
interpreting the text data for a degree of sensitivity; and
when the text data exceeds a censor threshold, censoring the text data.

13. The method of claim 1 further comprises determining the plurality of editing parameters based on content of the signal.

14. A selective editing circuit comprises:
signal receiver operably coupled to receive a signal and a plurality of editing parameters, wherein the signal includes at least one of: an audio signal and a video signal, and wherein the plurality of editing parameters indicates a degree of editing for corresponding portions of the signal and wherein the editing parameters are user supplied editing parameters;
signal processing circuit operably coupled to receive and process the signal based on editing signals; and
editing circuit operably coupled to receive the plurality of editing parameters, wherein the editing circuit compares the plurality of editing parameters with an editing threshold set by the user, wherein the editing circuit produces the editing signals, and, when one of the plurality of editing parameters exceeds the editing threshold, generating one of the editing signals, which causes the signal processing circuit to edit the corresponding portion of the signal.

15. The selective editing circuit of claim 14, wherein the plurality of editing parameters are embedded in the signal.

16. The selective editing circuit of claim 14, wherein the plurality of editing parameters are received in simulcast with the signal.

17. The selective editing circuit of claim 14, wherein the plurality of editing parameters further comprises a plurality of censoring parameters, wherein, when one of the plurality of censoring parameters exceeds a censoring threshold, the signal processing circuit censors the corresponding portion of the signal.

18. The selective editing circuit of claim 17 further comprises a user interface device that provides the censored threshold.

19. The selective editing circuit of claim 14 further comprises a database that stores substitute signals, wherein the signal receiver is operably coupled to receive a plurality of timestamps that are associated with the signal, wherein each of the plurality of timestamps relates to a corresponding one of the portions of the signal, and wherein the database is accessed to retrieve at least one of the substitute signals when one of the plurality of editing parameters or a corresponding one of the timestamps indicates that the corresponding portion of the signal is to be edited.

20. The selective editing circuit of claim 14 further comprises the substitute signal including at least one of: a blanking signal, an alternate video signal, an alternate audio signal, a scrambled video signal, a scrambled audio signal, a fading mute audio signal, and a fading blank video signal.

21. The selective editing circuit of claim 14, wherein the signal receiver is operably coupled to receive text data with the signal, and wherein the signal processing circuit edits the text data based on the one of the plurality of editing parameters when the one of the plurality of editing parameters indicates that the text data is to be edited.

22. The selective editing circuit of claim 14, wherein the editing circuit further comprises a determining circuit that determines the plurality of editing parameters based on content of the signal.

23. A system comprises:
a display that renders a decoded signal perceivable to a human;
a decoder operably coupled to receive an encoded signal and to produce the decoded signal therefrom, wherein the encoded signal includes at least one of an encoded video signal and an encoded audio signal; and
a selective editing circuit operably coupled to provide a source signal or selected ones of a plurality of substitute signals as the encoded signal to the decoder, wherein the selective editing circuit includes:
signal receiver operably coupled to receive the source signal and a plurality of editing parameters, wherein the source signal includes at least one of: an audio source signal and a video source signal, and wherein the plurality of editing parameters indicates a degree of editing for corresponding portions of the source signal and wherein the editing parameters are user supplied editing parameters;

signal processing circuit operably coupled to receive and process the source signal based on editing signals; and editing circuit operably coupled to receive and monitor the plurality of editing parameters and compare the editing parameters with an editing threshold set by the user, wherein the editing circuit produces the editing signals, and, when one of the plurality of editing parameters exceeds the editing threshold, generating one of the editing signals, which causes the signal processing circuit to provide one of the plurality of substitute signals in place of the corresponding portion of the signal.

24. The system of claim 23, wherein the plurality of editing parameters are at least one of: embedded in the source signal and received in simulcast with the source signal.

25. The system of claim 23, wherein the plurality of editing parameters further comprises a plurality of censoring parameters, wherein, when one of the plurality of censoring parameters exceeds a censoring threshold, the signal processing circuit censors the corresponding portion of the source signal.

26. The system of claim 23 further comprises a database that stores the plurality of substitute signals, wherein the signal receiver is operably coupled to receive a plurality of timestamps that are associated with the source signal, wherein each of the plurality of timestamps relates to a corresponding one of the portions of the source signal, and wherein the database is accessed to retrieve the one of the plurality of substitute signals when the one of the plurality of editing parameters or a corresponding one of the timestamps indicates that the corresponding portion of the signal is to be edited.

27. The system of claim 23, wherein the signal receiver is operably coupled to receive text data with the source signal, and wherein the signal processing circuit edits the text data based on the one of the plurality of editing parameters when the one of the plurality of editing parameters indicates that the text data is to be edited.

28. The system of claim 23, wherein the editing circuit further comprises a determining circuit that determines the plurality of editing parameters based on content of the signal.

* * * * *